(12) United States Patent
Brunel (10) Patent No.: US 6,987,818 B2
(45) Date of Patent: Jan. 17, 2006

(54) SIMPLIFIED METHOD OF DETECTION BY SPHERES WHEN THERE IS A LOW SIGNAL TO NOISE RATIO

(75) Inventor: Loïc Brunel, Rennes (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 765 days.

(21) Appl. No.: 10/029,953

(22) Filed: Dec. 31, 2001

(65) Prior Publication Data

US 2002/0126773 A1  Sep. 12, 2002

(30) Foreign Application Priority Data

Jan. 15, 2001 (FR) .................................. 01 00627

(51) Int. Cl.
*H03D 1/00* (2006.01)
(52) U.S. Cl. .................................. 375/340; 379/406.08
(58) Field of Classification Search ................ 375/340; 379/406.08
See application file for complete search history.

(56) References Cited

U.S. PATENT DOCUMENTS 6,137,881 A * 10/2000 Oh et al. ................ 379/406.08
6,788,785 B1 * 9/2004 Ding .................... 379/406.08

FOREIGN PATENT DOCUMENTS

EP          0 641 102     3/1995
WO          WO 00/41374   7/2000

OTHER PUBLICATIONS

Brunel et al.; "Euclidean Space Lattice Decoding for Joint Detection in CDMA Systems"; Proceedings of IEEE ITW; Jun. 20-25, 1999; p. 129.*

Umeda et al.; An Adaptive Filtering Algorithm using an Orthogonal Projection to an Affine Subspace and its Properties; Electronics and Communications in Japan; vol. 67-A, No. 5; 1984; pp. 19-27.*
Gay, S; "A Fast Converging, Low Complexity Adaptive Filtering Algorithm"; IEEE Workshop on Applications of Signal Processing to Audio; Mohonk Mountain House, New Paltz, New York; 1993; pp. 1-4.*
Douglass, S.C.; "Efficient Approximate Implementations of the Fast Affine Projection using orthogonal Transforms"; Acoustics, Speech, and Signal Processing, 1996. ICASSP-96. Conference Proceedings., vol. 3; May 1996; pp. 1656-1659.*

(Continued)

*Primary Examiner*—Stephen Chin
*Assistant Examiner*—Sudhanshu C. Pathak
(74) *Attorney, Agent, or Firm*—Oblon, Spivak, McClelland, Maier & Neustadt, P.C.

(57) ABSTRACT

Method of detecting a plurality of symbols transmitted by or to a plurality of users from a received signal, each symbol of a user belonging to a modulation constellation, the detection method using a lattice of points generated by the said modulation constellations, the said plurality of symbols of the different users being represented by a point amongst a subset of points in the said lattice, the said constellation and the received signal being represented by a point characteristic of this signal, referred to as the received point, translated from a point in the said constellation by a noise vector, the method including a step of orthogonal projection of the received point onto an affine subspace, referred to as a projection subspace, parallel to or merged with an affine subspace delimiting the constellation, and a step of seeking the closest neighbor to the point thus projected amongst the points in the constellation.

9 Claims, 5 Drawing Sheets

OTHER PUBLICATIONS

Tavathia et al.; "The Fast Affine Projection Algorithm"; Acoustics, Speech, and Signal Processing, 1995. ICASSP-95., 1995 International Conference on , vol.: 5, May 9-12, 1995 pp.: 3023-3026.*

Ding, H; "A Stable Fast Affine Projection Adaptation Algorithm suitable for low cost processors"; Acoustics, Speech, and Signal Processing, 2000. ICASSP '00. Proceedings. 2000 IEEE International Conference on , vol.: 1, Jun. 5-9, 2000 pp.: 360-363.*

U.S. Appl. No. 10/012,330, filed Dec. 12, 2001, Pending.
U.S. Appl. No. 10/011,757, filed Dec. 11, 2001, Pending.
U.S. Appl. No. 10/014,899, filed Dec. 14, 2001, Pending.
U.S. Appl. No. 10/029,953, filed Dec. 31, 2001, Pending.
G. J. Parker, International Symposium on Signal Processing and its Applications, ISSPA, vol. 1, XP-002178997, pp. 238-241, "Techniques for the Blind Estimation of Signal to Noise Ratio for Quadrature Modulated Signals" Aug. 25-30, 1996.

* cited by examiner

FIG.1

BACKGROUND ART

SIMPLIFIED METHOD OF DETECTION BY SPHERES WHEN THERE IS A LOW SIGNAL TO NOISE RATIO

BACKGROUND OF THE INVENTION

1. Field of the Invention

The present invention concerns a multiuser detection method and device. More particularly, the present invention concerns a multiuser detection method and device for a DS-CDMA or MC-CDMA telecommunication system.

2. Discussion of the Background

In a DS-CDMA (Direct Sequence Code Division Multiple Access) mobile telecommunication system, the separation of the communications coming from or going to the different users is achieved by multiplying each complex symbol of a user by a spreading sequence which is peculiar to him, also referred to for this reason as the user signature. The spreading frequency (chip rate) being greater than the frequency of the symbols, the signal transmitted by each user is distributed (or spread) in the space of the frequencies. The ratio between the band occupied by the spread signal and the band occupied by the information signal is referred to as the spreading factor. On reception, the separation of a given user is obtained by means of a filtering adapted to the corresponding signature. When the transmission channel has a plurality of propagation paths, the output of the adapted filtering contains as many correlation peaks. Each path of the channel can be modelled by a complex multiplicative coefficient and a delay. The signals being propagated along the different paths can be aligned and combined by means of complex coefficients which are conjugates of the path coefficients, thus effecting a filtering adapted to the transmission channel. In order to simplify the terminology, the general expression "filtering adapted to the user k" will encompass both the filtering operation adapted to the signature of the user k and the filtering operation adapted to the transmission channel.

To combat the interference between signals destined for (the downlink) or coming from (the uplink) the different users, multiuser detection methods have been proposed, and notably iterative detection methods such as those known as PIC (Parallel Interference Cancellation) and SIC (Serial Interference Cancellation). They are based on the iteration of an interference elimination cycle including the estimation of the symbols transmitted, the evaluation of the interferences and their subtraction from the signals received. Although of high performance, these methods are not optimal since they do not provide an estimation in the sense of the maximum likelihood of the symbols transmitted by the different users.

A method of multiuser detection with maximum likelihood inspired by the Viterbi algorithm was proposed by S. Verdu in an article entitled "Minimum probability of error for asynchronous Gaussian multiple access channels" published in IEEE Transactions on Information Theory, pages 85–96, January 1986, but its complexity is prohibitive since it varies exponentially with the number of users.

More recently a method of multiuser detection with maximum likelihood using a representation by a lattice of points was proposed by L. Brunel et al., in an article entitled "Euclidian space lattice decoding for joint detection in CDMA system" published in Proceedings of ITW, page 129, June 1999. According to this method, a vector characteristic of the received signal representing a statistic sufficient for the maximum likelihood detection of the symbols transmitted by the different users is determined. It is shown under certain conditions that the characteristic vector can be represented as the point in a lattice disturbed by a noise. The detection then consists of seeking the point in the lattice closest to the point corresponding to the vector received.

However, the dimension of the lattice to be used generally being 2K where K is the number of users, the number of points to be tested is high. To simplify detection, it has been proposed to limit the search for the closest neighbor to the points in the lattice belonging to a sphere centered around the point received. This simplified detection method, referred to as the "method of detection by spheres", will be disclosed below:

The context is a multiple access mobile telecommunication system with direct sequence spectrum spreading (DS-CDMA) comprising K users communicating synchronously with a base station.

Let $d_k(i)$ be the complex symbol sent by the user k at instant i. This symbol belongs to the modulation constellation $A_k$ used by the user k, which will also be referred to as the alphabet of symbols of the user k. Each user k transmits a block of N symbols with an amplitude of the signal $a_k$. The symbols are spread by a complex signature $s_k(t)=s_k^R(t)+j.s_k^I(t)$ with a duration equal to the symbol period T:

$$s_k(t)=0 \text{ if } t \notin [0,T[$$

The K complex symbols $d_k(i)=d_k^R(i)+j.d_k^I(i)$ transmitted at instant i are placed in a row vector of real values $d_2(i)$ defined as:

$$d_2(i)=(d_1^R(i), d_1^I(i), \ldots, d_K^R(i), d_K^I(i)) \quad (1)$$

The corresponding modulated signal is then, as a function of the time t:

$$S_t = \sum_{i=0}^{N-1} \sum_{k=1}^{K} a_k d_k(i) s_k(t-iT) \quad (2)$$

It is assumed that the channel is an ideal channel with white additive Gaussian noise.

Let $r_t=S_t+\eta_t$ be the signal received at time t and $\eta_t$ a complex Gaussian noise of zero mean whose components have a variance $N_0$.

Let the row vector be $y_2(i)=(y_1^R(i), y_1^I(i), \ldots, y_K^R(i), y_K^I(i))$ such that $y_k(i)=y_k^R(i)+j.y_k^I(i)$ is the complex output at instant i of the filter adapted to the user k:

$$y_k(i) \stackrel{\Delta}{=} \int_{-\infty}^{+\infty} s_k^*(t-iT) r_t dt \quad (3)$$

$$= \sum_{l=1}^{K} a_l d_l(i) \int_0^T s_l(t) s_k^*(t) dt + n_k(i)$$

$$= \sum_{l=1}^{K} a_l d_l(i) R_{lk} + n_k(i)$$

with $$R_{lk} = \int_0^T s_l(t) s_k^*(t) dt = R_{lk}^R + j \cdot R_{lk}^I$$

for $k, l = 1, \ldots, K$ and $n_k(i) = \int_0^T \eta_t \cdot s_k^*(t-i.T) dt$

The matrix R of autocorrelation of the spreading sequences depends in general on the index i since the signatures of the different users can change over time. However, for reasons of simplification of notation, this index will be omitted hereinafter.

If the complex elements of (3) are decomposed into their real and imaginary parts, there is obtained:

$$[y_k^R(i) + j \cdot y_k^I(i)] = \sum_{l=1}^{K} a_l [b_l^R(i) R_{lk}^R - b_l^I(i) R_{lk}^I] + \qquad (4)$$

$$j \cdot \sum_{l=1}^{K} a_l [b_l^R(i) R_{lk}^I + b_l^I(i) R_{lk}^R] +$$

$$[n_k^R(i) + j \cdot n_k^I(i)]$$

Let $Á_2 = \mathrm{Diag}(a_1, a_1, \ldots, a_K, a_K)$ and $R_2$ be the matrix of size $2K \times 2K$ such that:

$$R_2 = \begin{bmatrix} R_{11}^R & R_{11}^I & \cdots & R_{1K}^R & R_{1K}^I \\ -R_{11}^I & R_{11}^R & \cdots & -R_{1K}^I & R_{1K}^R \\ \vdots & \vdots & & \vdots & \vdots \\ R_{KI}^R & R_{KI}^I & \cdots & R_{KK}^R & R_{KK}^I \\ -R_{KI}^I & R_{KI}^R & \cdots & -R_{KK}^I & R_{KK}^R \end{bmatrix} \qquad (5)$$

Equation (4) can then be put in matrix form:

$$y_2(i) = d_2(i) M_2 + n_2(i) \qquad (6)$$

where $M_2$ is a real matrix of size $2K \times 2K$ defined by $M_2 = A_2 R_2$ and where the noise vector $n_2(i) = (n_1^R(i), n_1^I(i), \ldots, n_K^R(i), n_K^I(i))$ has $N_0 R_2$ as its covariance matrix.

It will be demonstrated below that $y_2(i)$, as given by equation (6), can be represented as a point in a lattice $\Lambda_2$ of dimension $2K$, with a generator matrix $M_2$ corrupted by a noise $n_2$.

The term real lattice of points $\Lambda$ of dimension $\kappa$ will be used for any set of vectors of $R^{\hat{e}}$ satisfying:

$$x = b_1 v_1 + b_2 v_2 + \ldots + b_{\hat{e}} v_{\hat{e}} \text{ where } b_i \in Z, \forall i=1, \ldots, \kappa$$

and where $\{v_1, v_2, \ldots, v_K\}$ is a base on $R^{\kappa}$.

Figure 1:
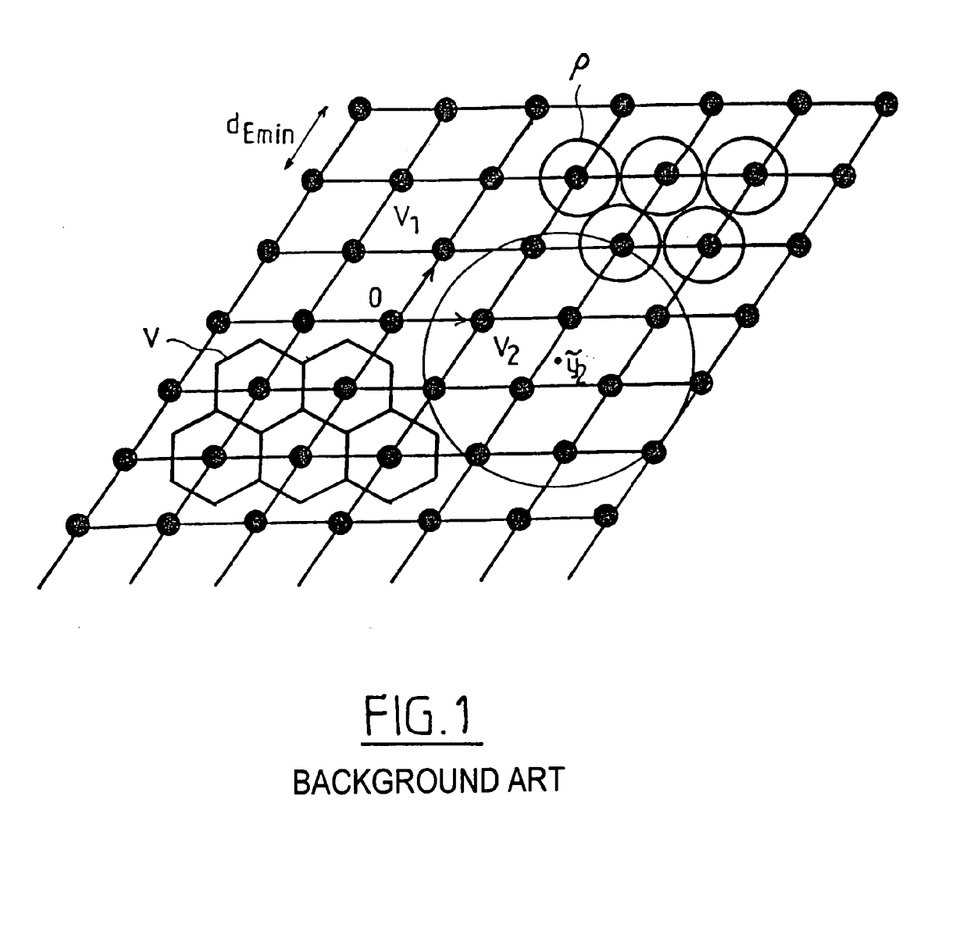
FIG. 1 depicts a lattice of points useful to the detection method employed in the receiver illustrated in FIG. 2.

An example of a lattice of points of dimension 2 has been shown in FIG. 1.

The points in the lattice form an additive abelian subgroup of $R^{\hat{e}}$, and it is also the smallest sub-group of $R^{\kappa}$ containing the vectors $\{v_1, v_2, \ldots, v_\kappa\}$ and a Z-modulus of $R^{\kappa}$. These base vectors form the rows of the generator matrix G for the lattice. It is therefore possible to write $$x = bG \text{ where } b = (b_1, \ldots, b_\kappa) \in Z^\kappa. \qquad (7)$$

The region delimited by the base vectors is referred to as the fundamental parallelotope and its volume, denoted vol($\Lambda$) and det($\Lambda$), is referred to as the fundamental volume. This fundamental volume is none other than the modulus of the vectorial product of the $\kappa$ base vectors and is therefore equal to |det(G)| where det(.) designates the determinant. Though there are several possible choices for the generator matrix for the same lattice, on the other hand there is only one value for the fundamental volume.

The Voronoi region V or Dirichlet cell of a point x belonging to the lattice is all the points of $R^\kappa$ closer to x than any other point in the lattice. The volume of this region is equal to the fundamental volume.

The stacking radius $\rho$ of the lattice is the radius of the largest sphere inscribed in the Voronoi region and the radius of coverage that of the smallest sphere circumscribed in this same region. The stacking radius is therefore the radius of the spheres whose stacking constitutes the lattice of points and the radius of coverage is that of the smallest spheres which, centred on the points in the lattice, make it possible to cover the entire space $R^\kappa$. The density of the lattice is the ratio between the volume of the sphere of radius $\rho$ and the fundamental volume. Finally, the coefficient of error (the kissing number) $\tau(\Lambda)$ of the lattice is the number of spheres tangent to one and the same sphere in the stack or, in other words, the number of neighbours of a point in the lattice, situated at the minimum distance $d_{Emin} = 2\rho$.

Consider once again equation (6). The components of the vector $d_2(i)$ belong to a finite alphabet A of cardinal:

$$\mathrm{Card}(A) = \prod_{k=1}^{K} \mathrm{Card}(A_k) \qquad (8)$$

The term A will be used for the constellation of the system (or simply constellation) as opposed to $A_k$ said to be modulation constellations.

Assume for example that the components $d_k^R(i)$ and $d_k^I(i)$ are PAM modulation symbols of order M:

$$d_k^R(i) \in \{-M+1, -M+3, \ldots, M-3, M-1\} \qquad (9)$$

and $$d_k^I(i) \in \{-M+1, -M+3, \ldots, M-3, M-1\} \qquad (10)$$

If the transformation is effected:

$$d_k'^R(i) = \frac{1}{2}(d_k^R(i) + M - 1) \text{ and } d_k'^I(i) = \frac{1}{2}(d_k^I(i) + M - 1) \qquad (11)$$

or again vectorially:

$$d_2'(i) = \frac{1}{2}(d_2(i) + v_M)$$

where $v_M = (M-1, M-1, \ldots, M-1)$ the components $d'_k^R(i)$ and $d'_k^I(i)$ are elements of Z and consequently $d'_2(i)$ is a vector of $Z^{2K}$.

In general terms, if there exists an affine transformation transforming the components $d_k^R(i)$ and $d_k^I(i)$ into elements of Z, the vector $d'_2(i)$ can be represented by a vector of $Z^{2K}$.

In a similar manner, the corresponding transformation is effected on $y_2(i)$, that is to say:

$$y_2'(i) = \frac{1}{2}(y_2(i) + v_M M_2) \qquad (12)$$

By means of this transformation, which is assumed to be implicit hereinafter, the vector $d_2(i) M_2$ then belongs to a lattice of points $\Lambda_2$ of dimension $2K$ as defined by equation (7) with $G = M_2$. The vector $y_2(i)$ can then be considered to be a point in the lattice $\Lambda_2$ corrupted by a noise $n_2(i)$.

If it is assumed that the components of the noise vector $n_2(i)$ are centred independent random Gaussian variables, the problem of detection in the sense of the maximum likelihood of the symbols transmitted by the different users amounts to a search for the point $z_2$ in the lattice $\Lambda_2$ such that its distance to $y_2(i)$ is at a minimum.

In reality, the components of the noise vector $n_2(i)$ are correlated and the covariance matrix of $n_2(i)$ is $N_0R_2$.

In order to boil down to the decorrelated case it is necessary, prior to the decoding, to effect an operation of whitening of the noise.

The matrix R being hermitian, the autocorrelation matrix $R_2$ is symmetrical defined positive and can therefore be the subject of a Cholesky factorisation:

$$R_2 = W_2 W_2^T \quad (13)$$

where $W_2$ is an inferior triangular matrix of size 2K×2K.
A whitened observation vector is defined:

$$\tilde{y}_2(i) = y_2(i) W_2^{T-1} \quad (14)$$

and a new lattice of points $\Omega_2$ consisting of vectors of components $(\tilde{x}_1^R(i), \tilde{x}_1^I(i), \ldots, \tilde{x}_K^R(i), \tilde{x}_K^I(i))$ with $\tilde{x}^2(i) = x_2(i) W_2^{T-1}$ where $x_2(i)$ is a vector of components $(x_1^R(i), x_1^I(i), \ldots, x_K^R(i), x_K^I(i))$ belonging to $\Lambda_2$. The lattice $\Omega_2$ has an inferior triangular real matrix as its generator matrix $A_2 W_2$.

It can easily be shown that, after whitening, the covariance matrix of the filtered noise $n_2(i) W_2^{T-1}$ is equal to $N_0 I_{2K}$ where $I_{2K}$ is the identity matrix of dimension 2K. The detection therefore comprises a first step of whitening the observation vector followed by a step of seeking the closest neighbour within the lattice of points $\Omega_2$.

In order to reduce the number of points to be tested, as illustrated in FIG. 1, it is possible to limit the search to a sphere centred around the point $\tilde{y}_2$. In practice, the choice of the radius of the sphere results from a compromise: it must not be too large in order not to lead to an excessively high number of points and sufficiently large to include at least the closest neighbour.

Figure 2:
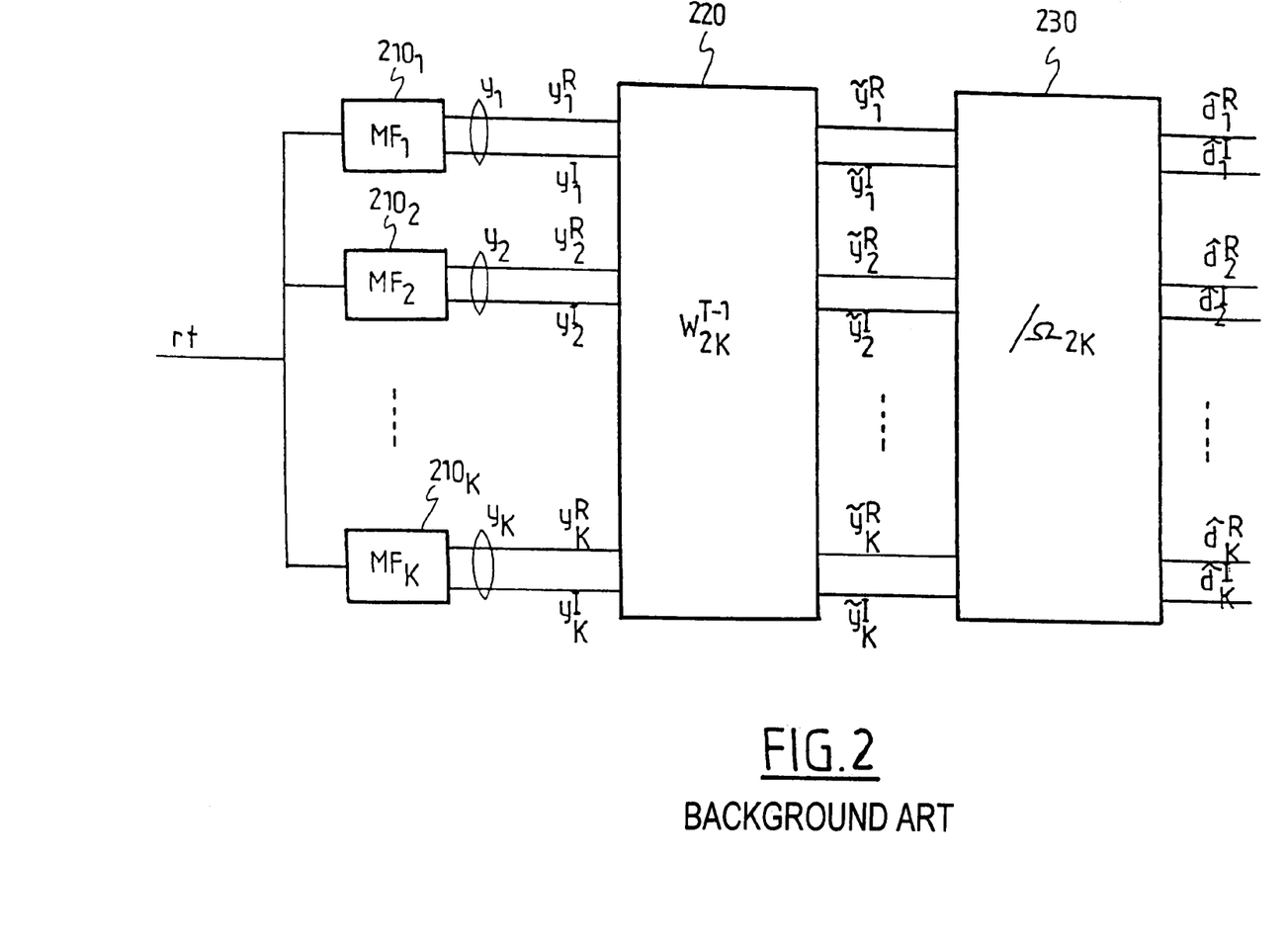
FIG. 2 depicts schematically the structure of a multiuser DS-CDMA receiver using a method of detection by spheres.

FIG. 2 depicts schematically a multiuser detection device using a method of detection by spheres. The received signal n is filtered by a battery of filters adapted to each of the users, $210_1, \ldots, 210_K$. The real and imaginary components of the observation vector $y_2(i)$ output from the adapted filters are transmitted to a matrix calculation unit performing the spectral whitening operation according to equation (14). The real and imaginary components of the whitened vector $\tilde{y}_2(i)$ are then transmitted to a unit for detection by spheres seeking the closest neighbor of the point received within the lattice $\Omega_2$ of dimension 2K. The coordinates of the closest neighbor directly give the real and imaginary components of the estimated symbols $\hat{d}_k(i)$ for the different users.

The step of seeking the closest neighbour is greedy in calculation time, which may prove very disadvantageous when the number of users is high. In addition, when the signal to noise ratio is low, it is necessary to choose a large radius for the search sphere and there is a high risk of having to consider a large number of points in the lattice in the search step.

SUMMARY OF THE INVENTION

The aim of the present invention is to propose a simplification of the method of detection by spheres, notably when there is a low signal to noise ratio.

The invention is defined by a method of detecting a plurality K of symbols ($d_k(i)$) transmitted by or for a plurality K of users from a received signal, each symbol of a user belonging to a modulation constellation, the detection method using a lattice of points ($\Xi$) generated by the said modulation constellations, the said plurality of symbols of the different users being represented by a point amongst a subset of points in the said lattice, the said constellation and the received signal being represented by a point characteristic of this signal, referred to as the received point, translated from a point in the said constellation by a noise vector (n), the method comprising a step of orthogonal projection of the received point onto an affine subspace, referred to as a projection subspace, parallel to or merged with an affine subspace delimiting the said constellation, and a step of seeking the closest neighbour of the point thus projected amongst the points in the said constellation.

Advantageously, the said affine subspace delimiting the constellation is determined according to the position of the point received with respect to the said constellation.

According to a variant embodiment, the search for the closest neighbor is limited to the points of the constellation belonging to a sphere centered on the projected point.

If the affine projection subspace is merged with an affine subspace delimiting the constellation, the search for the closest neighbour can be effected amongst the points of the constellation belonging to the said affine subspace.

The search for the closest neighbor is advantageously limited to the points in the affine subspace belonging to a sphere of the subspace centered on the projected point.

According to one advantageous embodiment, the projection step is performed only if the received point is distant from the constellation by more than a predetermined distance.

The present invention has in particular an application to transmission in DS-CDMA or MC-CDMA mode. In this case, the symbols of each user being the subject of a multiplication by a signature of this user before being transmitted over a transmission channel, the coordinates of the received point are obtained by a filtering step adapted to the received signal, the filtering being adapted to the transmission channels and to the signatures of the different users.

The present invention also concerns a reception device for a DS-CDMA telecommunications system comprising a detection device adapted to implement the detection method disclosed above.

The present invention also concerns a reception device for an MC-CDMA telecommunications system comprising a detection device adapted to implement the detection method disclosed above.

BRIEF DESCRIPTION OF THE DRAWINGS

The characteristics of the invention mentioned above, as well as others, will emerge more clearly from a reading of the following description given in relation to the accompanying figures, amongst which.

DESCRIPTION OF THE PREFERRED EMBODIMENTS

Consider once again a DS-CDMA telecommunication system with K users functioning in synchronous mode. As seen above, the detection of the symbols transmitted by the different users in the sense of the maximum likelihood can be reduced to a search amongst the points in a lattice ($\Omega_2$) for the closest neighbour of the point corresponding to the received signal.

In the case where the spreading sequences are real or more generally real multiples of the same complex number, it can be shown that the search can be carried out in a lattice with a dimension reduced to K. This is because the imaginary terms of the matrix $R_2$ and consequently of the matrix $M_2$ being zero, it is possible to boil down to a lattice of real points $\Lambda$ of dimension K and of generator matrix M:

$$y^R(i) = d^R(i)M + n^R(i) \quad (15)$$

$$y^I(i) = d^I(i)M + n^I(i) \quad (16)$$

where $y^R(i), d^R(i), n^R(i)$ (or respectively $y^I(i), d^I(i), n^I(i)$) are the vectors consisting of the real parts (or respectively of the imaginary parts) of the components of $y(i), d(i), n(i)$; M=AR where R is the matrix consisting of the coefficients $$R_{lk} = \int_0^T s_l(t) s_k(t) dt$$

and A is the vector of the amplitudes of the K users. The observation vectors $y^R(i)$ and $y^I(i)$ belong to $R^K$. After any transformation according to an equation of the same type as (12), the vectors $y^R(i)$ and $y^I(i)$ can be considered to be points in a lattice $\Lambda$ of generator matrix M corrupted by noise.

It can easily be shown that the noise vectors $n^R(i)$ and $n^I(i)$ both have the covariance matrix $N_0 R(i)$. Since R is a symmetrical matrix defined positive, it can be factorized according to a Cholesky decomposition: $R = WW^T$ where W is an inferior triangular real matrix of size K×K. In order to decorrelate the noise components, the real observation vectors $y^R(i)$ and $y^I(i)$ are first of all subjected to a whitening operation:

$$\tilde{y}^R(i) = y^R(i) W^{T-1} \quad (17)$$

$$\tilde{y}^I(i) = y^I(i) W^{T-1} \quad (18)$$

Secondly, the closest neighbours of the vectors $\tilde{y}^R(i)$ and $\tilde{y}^I(i)$ belonging to the lattice of points $\Omega$ formed by the vectors $\tilde{x}(i) = x(i) W^{T-1}$, where x(i) belongs to $\Lambda$, are sought. It should be noted that the generator matrix of the lattice $\Omega$ is equal to AW, an inferior triangular real matrix. In addition, it can easily be shown that, after whitening, the covariance matrices of the filtered noises $n^R(i)W^{T-1}$ and $n^I(i)W^{T-1}$ are both equal to $N_0 I_K$ where $I_K$ is the identity matrix of dimension K.

When the symbols of or for the users are transmitted asynchronously, the modeling of the system is more complex since it is necessary to take account of the fact that a symbol of a user can interfere with two or even several consecutive symbols of another user. It can be shown in this case that it is possible to reduce the action to a search for the closest neighbor within a lattice of dimension 2K' (K' in the case of real signatures) with K'>K where K' is a function of the number of symbols not yet estimated which may interfere with each other. The detection is however not optimum in the sense of the maximum likelihood.

In all cases, the problem is to determine the point x in a lattice $\Xi$ of dimension $\kappa$ closest to the received whitened vector $\tilde{y}$, which amounts to minimising the metric $$m(\tilde{y}/x) = \sum_{i=1}^{K} |\tilde{y}_i - x_i|^2 = \|\tilde{y} - x\|^2 \quad (19)$$

where $y = x + \eta$, $\eta = (\eta_1, \ldots, \eta_\kappa)$ is the noise vector and $x = (x_1, \ldots, x_\kappa)$ is a point belonging to the lattice. The noise vector $\eta$ has independent real components in a Gaussian distribution of zero mean and variance $N_0$.

It should be noted that the vector y(i) does not need to be whitened if use is made of a metric based on the covariance matrix:

$$m(y/x) = (y-x) R^{-1} (y-x)^T \quad (19')$$

Hereinafter, for reasons of simplification, the observation vector, whitened ($\tilde{y}(i)$) or not ($y(i)$) will be termed z and the developments below will be limited to the metric defined in (19).

The points in the lattice $\Xi$ can be described by the vectors $x = bG$ where $b = (b_1, \ldots, b_\kappa)$ has components $b_i$ belonging to the ring of the integers Z and where G is the generator matrix of the lattice. The rows of the matrix G are denoted $\{v_1, v_2, \ldots, v_\kappa\}$. By definition these vectors form a base of the lattice.

The set of transmitted symbols is limited to an alphabet of finite size $A_\kappa \subset Z^\kappa$ referred to as a constellation. This constellation is determined by the modulation constellations used by (or for) the $\kappa$ users and the cardinal of the alphabet $A_\kappa$ is the product of the cardinals of the different modulation alphabets. It is assumed that the complex points of each of these constellations have real values and evenly distributed imaginary values.

As has been seen, an exhaustive decoding would require a search for the closest neighbour throughout $A_\kappa$. The decoder advantageously restricts its calculation to the points which are situated within an area of the constellation situated around the received point, preferably inside a sphere of given radius $\sqrt{C}$ centred on the received point as depicted in FIG. 1. Only the points in the lattice situated at a quadratic distance less than C from the received point are therefore considered for the minimisation of the metric (19).

In practice, the decoder effects the following minimisation:

$$\min_{x \in \Xi} \|z - x\| = \min_{w \in z - \Xi} \|w\| \quad (20)$$

To do this, the decoder seeks the smallest vector w in the translated set $z - \Xi$. The vectors z and w can be expressed as:

$$z = \rho G \text{ with } \rho = (\rho_1, \ldots, \rho_\kappa)$$

$$w = \xi G \text{ with } \xi = (\xi_1, \ldots, \xi_\kappa) \quad (21)$$

It is important to note that ρ and ξ are real vectors. As w=z−x, where x belongs to the lattice Ξ, this gives the equation $\xi_i = \rho_i - b_i$ for i=1, ..., κ with $$w = \sum_{i=1}^{\kappa} \xi_i v_i.$$

The vector w is a point in the lattice whose coordinates $\xi_i$ are expressed in the translated reference frame centred on the received point. The vector w belongs to a sphere of quadratic radius C centred at 0 if:

$$\|w\|^2 = Q(\xi) = \xi GG^T \xi^T \leq C \quad (22)$$

In the new system of coordinates defined by ξ, the sphere of quadratic radius C centred at y is therefore transformed into an ellipsoid centred on the origin. The Cholesky factorisation of the Gram matrix $\Gamma = GG^T$ gives $\Gamma = \ddot{A}\ddot{A}^T$, where Δ is an inferior triangular matrix of elements $\delta_{ij}$.

It should be noted that, if the metric defined by (19') had been used, without prior whitening of y, the Gram matrix Γ should be replaced by the matrix $GR^{-1}G^T$, a symmetrical matrix defined as positive and therefore capable of a Cholesky factorisation.

It should also be noted that, if the vector y has been whitened, it is not necessary to effect the Cholesky factorisation since the generator matrix of the lattice is already inferior and triangular.

Where prior whitening has not been carried out, Cholesky decomposition is necessary:

$$Q(\xi) = \xi \ddot{A}\ddot{A}^T \xi^T = \|\ddot{A}^T \xi^T\|^2 = \sum_{i=1}^{\kappa} \left(\delta_{ii}\xi_i + \sum_{j=i+1}^{\kappa} \delta_{ji}\xi_j\right)^2 \leq C \quad (23)$$

By putting $$q_{ii} = \ddot{a}_{ii}^2 \text{ for } i=1, \ldots, \hat{e}$$

$$q_{ij} = \ddot{a}_{ij}/\ddot{a}_{jj} \text{ for } j=1, \ldots, \hat{e}; i=j+1, \ldots \hat{e} \quad (24)$$

there is obtained $$Q(\xi) = \sum_{i=1}^{\kappa} q_{ii}\left(\xi_i + \sum_{j=i+1}^{\kappa} q_{ji}\xi_j\right)^2 \quad (25)$$

Being concerned first of all with the range of possible variations of $\xi_\kappa$, and then by adding the components one by one, the following κ inequalities are obtained, which define all the points within the ellipsoid:

$$q_{\kappa\kappa}\xi_\kappa^2 \leq C$$

$$q_{\kappa-1,\kappa-1}(\xi_{\kappa-1} + q_{\kappa,\kappa-1}\xi_\kappa)^2 + q_{\kappa\kappa}\xi_\kappa^2 \leq C \quad (26)$$

$$\forall l \in \{1;\kappa\}, \sum_{i=l}^{\kappa} \left(q_{ii}\left(\xi_i + \sum_{j=i+1}^{\kappa} q_{ji}\xi_j\right)\right)^2 \leq C$$

It can be shown that the inequalities (26) make it necessary for the integer components of b to satisfy:

$$\left\lceil -\sqrt{\frac{C}{q_{\kappa\kappa}}} + \rho_\kappa \right\rceil \leq b_\kappa \leq \left\lfloor \sqrt{\frac{C}{q_{\kappa\kappa}}} + \rho_\kappa \right\rfloor \quad (27)$$

$$\left\lceil -\sqrt{\frac{C - q_{\kappa\kappa}\xi_\kappa^2}{q_{\kappa-1,\kappa-1}}} + \rho_{\kappa-1} + q_{\kappa,\kappa-1}\xi_\kappa \right\rceil \leq$$

$$b_{\kappa-1} \leq \left\lfloor -\sqrt{\frac{C - q_{\kappa\kappa}\xi_\kappa^2}{q_{\kappa-1,\kappa-1}}} + \rho_{\kappa-1} + q_{\kappa,\kappa-1}\xi_\kappa \right\rfloor$$

$$\left\lceil -\sqrt{\frac{1}{q_{ii}}\left(C - \sum_{l=i+1}^{\kappa} q_{ll}\left(\xi_l + \sum_{j=l+1}^{\kappa} q_{jl}\xi_j\right)^2\right)} + \rho_i + \sum_{j=i+1}^{\kappa} q_{ji}\xi_j \right\rceil \leq b_i$$

$$b_i \leq \left\lfloor \sqrt{\frac{1}{q_{ii}}\left(C - \sum_{l=i+1}^{\kappa} q_{ll}\left(\xi_l + \sum_{j=l+1}^{\kappa} q_{jl}\xi_j\right)^2\right)} + \rho_i + \sum_{j=i+1}^{\kappa} q_{ji}\xi_j \right\rfloor$$

where $\lceil x \rceil$ is the smallest integer greater than the real number x and $\lfloor x \rfloor$ is the largest integer smaller than the real number x.

The decoder has κ internal counters, namely one counter per dimension, each counter counting between a lower and upper bound as indicated in (27), given that each counter is associated with a particular pair of bounds. In practice these bounds can be updated recursively. We put:

$$S_i = S_i(\xi_{i+1}, \ldots, \xi_\kappa) = \rho_i + \sum_{j=i+1}^{\kappa} q_{ji}\xi_j \quad (28)$$

$$T_{i-1} = T_{i-1}(\xi_i, \ldots, \xi_\kappa) \quad (29)$$

$$= C - \sum_{l=i}^{\kappa} q_{ll}\left(\xi_l + \sum_{j=l+1}^{\kappa} q_{jl}\xi_j\right)^2$$

$$= T_i - q_{ii}(\xi_i + S_i - \rho_i)^2$$

$$T_{i-1} = T_i - q_{ii}(S_i - b_i)^2$$

with $T_{\kappa = C}$ (30)

Using equations (28) to (30), the range of variation of each component $b_i$ is determined recursively, commencing with the component $b_\kappa$:

$$L_i^- \leq b_i \leq L_i^+ \quad (31)$$

with $$L_i^- = \left\lceil -\sqrt{\frac{T_i}{q_{ii}}} + S_i \right\rceil \quad \text{et} \quad L_i^+ = \left\lfloor \sqrt{\frac{T_i}{q_{ii}}} + S_i \right\rfloor \quad (32)$$

Figure 3:
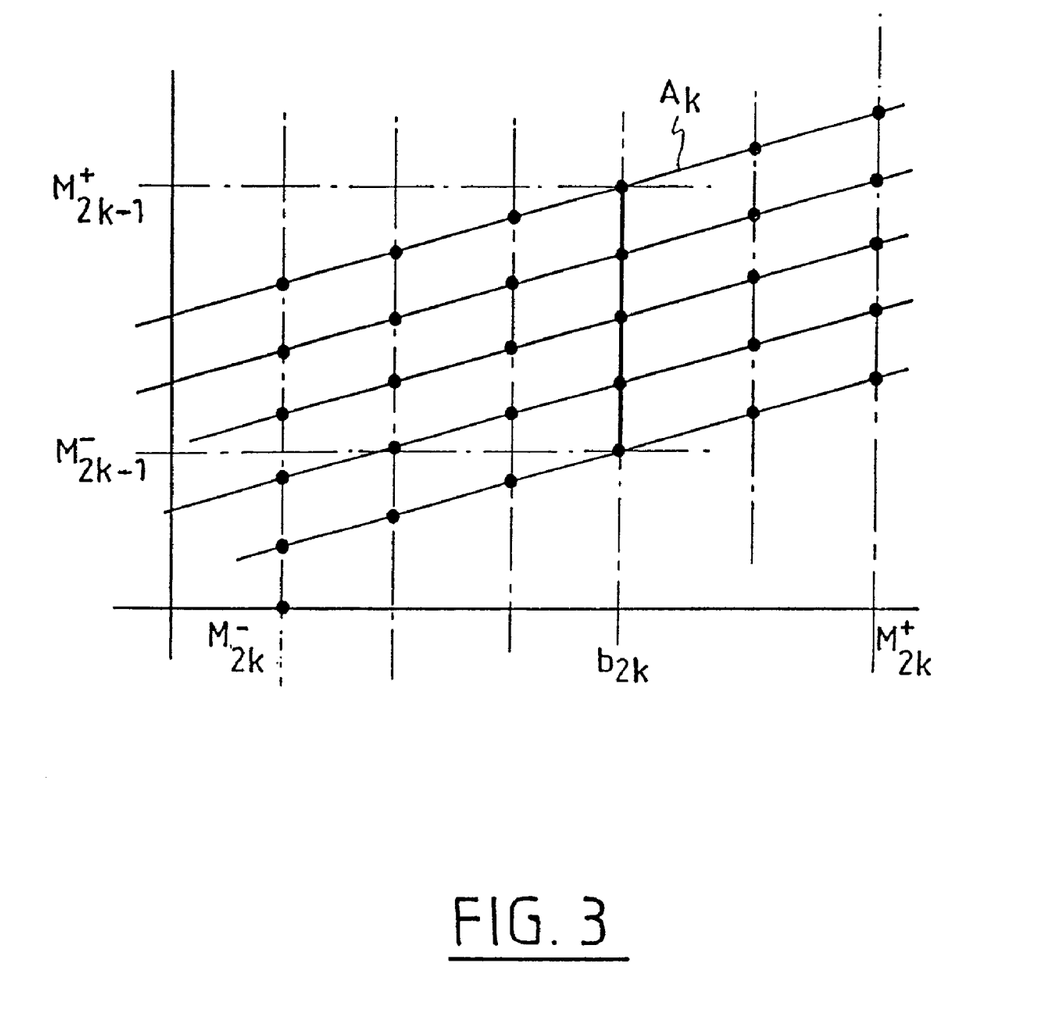
FIG. 3 depicts an example of a user modulation constellation.

The ranges of variation defined by (32) are advantageously restricted so as not to unnecessarily test points which are situated outside the constellation. It should be stated that each user k uses a constellation of symbols $A_k$, each symbol of the constellation being a complex number whose real and imaginary parts (possibly after affine transformation) are elements of Z. The general case is first of all taken where the lattice is of dimension 2K, where K is the number of users. For each user k, the dimensions 2k and 2k−1 bearing the complex symbol transmitted by or for the user k are considered. As indicated in FIG. 3, the constellation, or equivalently the modulation constellation of the user k, is first of all projected onto the dimension 2k. This projection defines an interval $[M_{2k}^-, M_{2k}^+]$. The search interval $[B_{2k}^-, B_{2k}^+]$ is then defined where:

$$B_{2k}^- = Upp(L_{2k-1}^-, M_{2k-1}^-) \text{ and } B_{2k}^+ = Low(L_{2k}^+, M_{2k}^+) \quad (33)$$

and an integer $b_{2k}$ is chosen in this interval. The component $b_{2k}$ then defines an interval $[M_{2k-1}^-, M_{2k-1}^+]$ for the component $b_{2k-1}$ as indicated in FIG. 3. A search interval $[B_{2k-1}^-, B_{2k-1}^+]$ is then defined by:

$$B_{2k-1}^- = Upp(L_{2k-1}^-, M_{2k-1}^-) \text{ and } B_{2k-1}^+ = Low(L_{2k-1}^+, M_{2k-1}^+) \quad (33')$$

By proceeding in this way it is ensured that the closest neighbour is sought only amongst candidates which are both situated in the search sphere and points in the constellation.

The situation is slightly different when real spreading sequences are used and therefore when the lattice is of dimension K (where K is the number of users). In this case, the real and imaginary values of the symbols are the subject of parallel searches in a lattice $(\Lambda, \Omega)$ of dimension K. The calculation of the search bounds (and the choice of the values of the components) relates by turns to the real part and the imaginary part, in an interleaved fashion.

In the simple example where the modulation employed on a dimension i is a PAM modulation of order M, the integer coordinate $b_i$ of the point sought must be between 0 and M−1. The search bounds are adjusted by $B_i^- = Upp(L_i^-, 0)$ and $B_i^+ = Low(L_i^+; M-1)$ so that the counter associated with the component $b_i$ does not travel over points which are situated outside the search sphere or outside the constellation. This adjustment of the search bounds considerably accelerates the algorithm for detection by spheres.

A problem occurs when the received vector is situated outside the constellation, for example because the noise on one or more of the connections is high. If a conventional detection by spheres is used, the search sphere may not contain any point in the constellation. Likewise, if use is made of a detection by spheres limited to the constellation, the search interval $[B_i^-, B_i^+]$ may be empty for certain dimensions i because $L_i^+ < M_i^-$ or $L_i^- > M_i^+$. In both cases, it is necessary to increase the radius of the sphere until a point in the constellation is found, which may give rise to many unnecessary search steps and therefore considerably slow down the algorithm.

Figure 4:
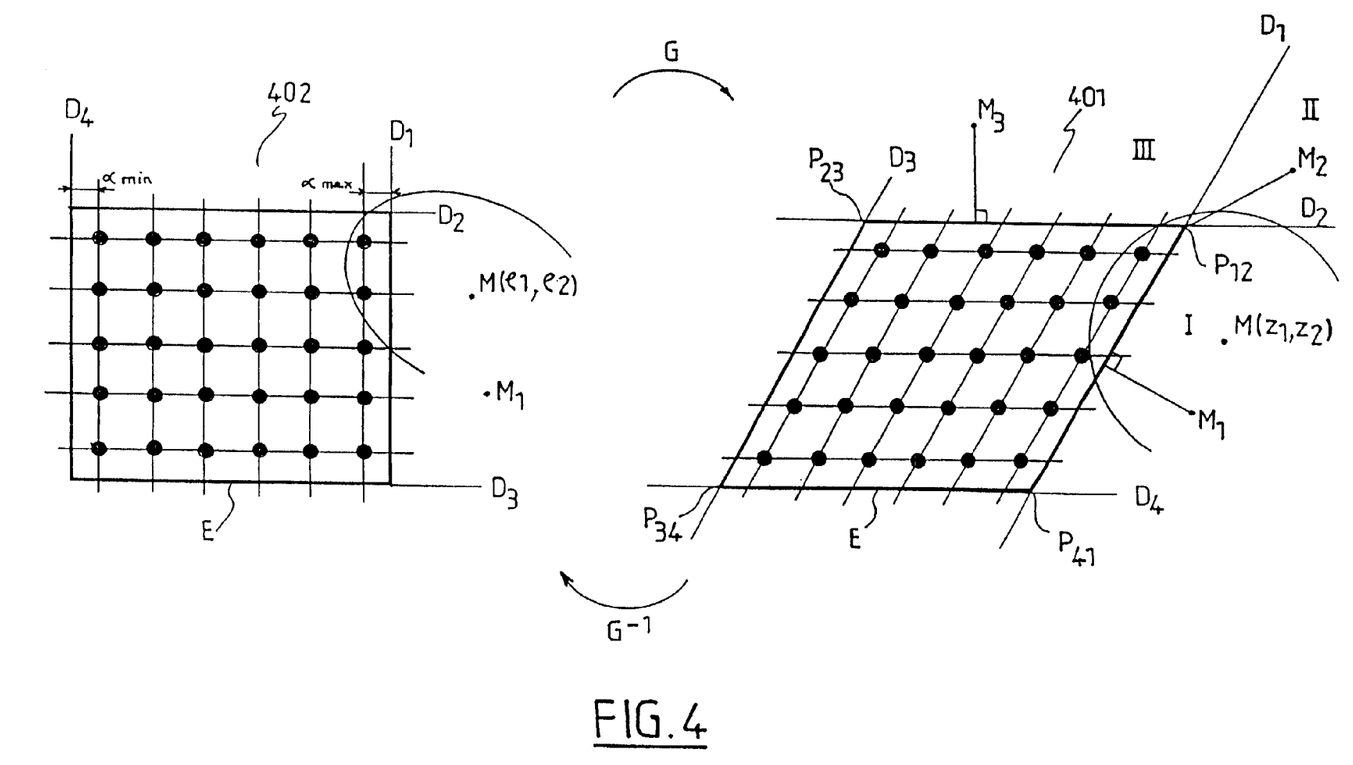
FIG. 4 illustrates a preliminary operation of projection onto the constellation according to the invention.

When the constellation has a parallelepipedal shape, for example when the modulation constellations of the different users are of the PAM or QAM type, the present invention proposes to orthogonally project the received point onto an affine subspace (or linear variety) delimiting or bordering the constellation. FIG. 4 depicts schematically a constellation in the form of a parallelogram (here k=2), to the right (401) in the canonical base of the Euclidian space $R^k$ and to the left (402) in the base of the generator vectors of the lattice. It should be stated that a received point is represented by a vector z in the canonical base and by a vector p in the generator base, such that z=ñG. In the representation 401, the space $R^k$ is provided with the Euclidian norm $$\|z\|^2 = \sum_{i=1}^{\kappa} z_i^2$$

and at 402 with the norm $Q(\tilde{n}) = \tilde{n} G G^T \tilde{n}^T$. Thus a sphere centered on the received point z in the representation at 401 is transformed into an ellipsoid centered on the received point ρ at 402. As illustrated at 401, a received point not belonging to the constellation is first of all projected orthogonally onto the latter or more generally onto an envelope E of this constellation. The choice of the affine subspace onto which the projection is effected depends on the position of the received point. Thus, for example, the point $M_1$ belonging to the zone I delimited by the straight lines $D_1$, $D_2$, $D_4$ is projected onto the straight line $D_1$, the point $M_2$ belonging to the zone II delimited by the straight lines $D_1$ and $D_2$ is "projected" onto the apex $P_{12}$ (that is to say the image of any point belonging to this sector will be the point $P_{12}$), the point $M_3$ belonging to the zone III delimited by the straight lines $D_2$, $D_1$, $D_3$ is projected onto the straight line $D_2$, etc. As will be seen below, this choice of projection is sub-optimal. It is however preferred for its ease of implementation. Naturally, the different types of affine subspaces onto which a projection can be effected depend on the dimension of the lattice. Thus, for a parallelepiped-shaped constellation generating a lattice of dimension 3, the affine subspaces to be considered will be the faces, the edges, and the vertices of the parallelepiped. In general terms, for a lattice of dimension k, the affine subspaces to be considered will be of dimension N=k−L with $1 \leq L \leq k$.

The projection is easier to effect in the representation 402. This is because, if the coordinates of a point in the base of the generator vectors of the lattice are denoted $\beta_l$ the straight lines $D_l$ are defined by the equations:

$$\beta_l = \beta_{min,l} = M_l^- - \alpha_{min,l} \text{ or } \beta_l = \beta_{max,l} = M_l^+ + \alpha_{max,l} \quad (34)$$

where $\alpha_{min,l}$ and $\alpha_{max,l}$ are positive real values defining the margins between the constellation and its envelope. The values of $\alpha_{min,l}$ and $\alpha_{max,l}$ can be taken to be equal to the same value α. This value can also be chosen so as to be zero if it is wished to directly effect the projection onto the constellation.

In the general case of a lattice of any dimension κ, the affine subspaces to be considered are defined by L equations of the type (34). Let $T^0$ be such a subspace: any point belonging to this subspace has L coordinates fixed by equations of the type (34). It can be assumed without loss of generality that these L coordinates are the first L and that they are fixed at the maximum value $\beta_{max,l}$, that is to say $\rho_l = \beta_{max,l}$, l=1, ..., L.

Let $z^P = \rho^P G$ be the projection onto the affine subspace of dimension N of the received vector z. According to (34) the coordinates of $\rho^P$ are such that $\rho_l^P = \beta_{max,l}$, l=1, ..., L. It is therefore possible to write $$z^P = \rho^P G = \rho^0 B^0 + k.B = z^0 + k.B \quad (35)$$

where $\rho^0 = (\beta_{max,1}, \ldots, \beta_{max,L})$ is a row vector of dimension L, $z^0$ a row vector of dimension κ, k a row vector of dimension N representing the free coordinates of the vectorial subspace T associated with the affine subspace $T^0$, $B^0$ a matrix of size (L×κ) containing the first L rows of G and B a matrix of size (N×κ), which contains the last N rows of G forming a base of the vectorial subspace T.

In other words, $$G = \begin{bmatrix} B^0 \\ B \end{bmatrix} \quad (35)$$

The matrix G being of rank κ, the matrix B is itself of rank N, and it is therefore possible to define the pseudo-inverse matrix $B^+$ of B. This boils down to the vectorial subspace T by simple translation, by putting:

$$\tilde{z}^P = z^P - z^0$$

$$\tilde{z} = z - z^0 \quad (36)$$

Then:

$$\tilde{z}^P = \tilde{k}.B = \tilde{z}.B^+.B = \tilde{z}.B^H(B.B^H)^{-1}.B$$

$$z^P = (z - z^0)B^H(B.B^H)^{-1}.B + z^0 \quad (37)$$

The point corresponding to the vector $z^P$ is close to the constellation and its detection will therefore be much more rapid that that of the initial point. The gain in speed of detection is particularly appreciable for low signal to noise ratios.

Figure 5:
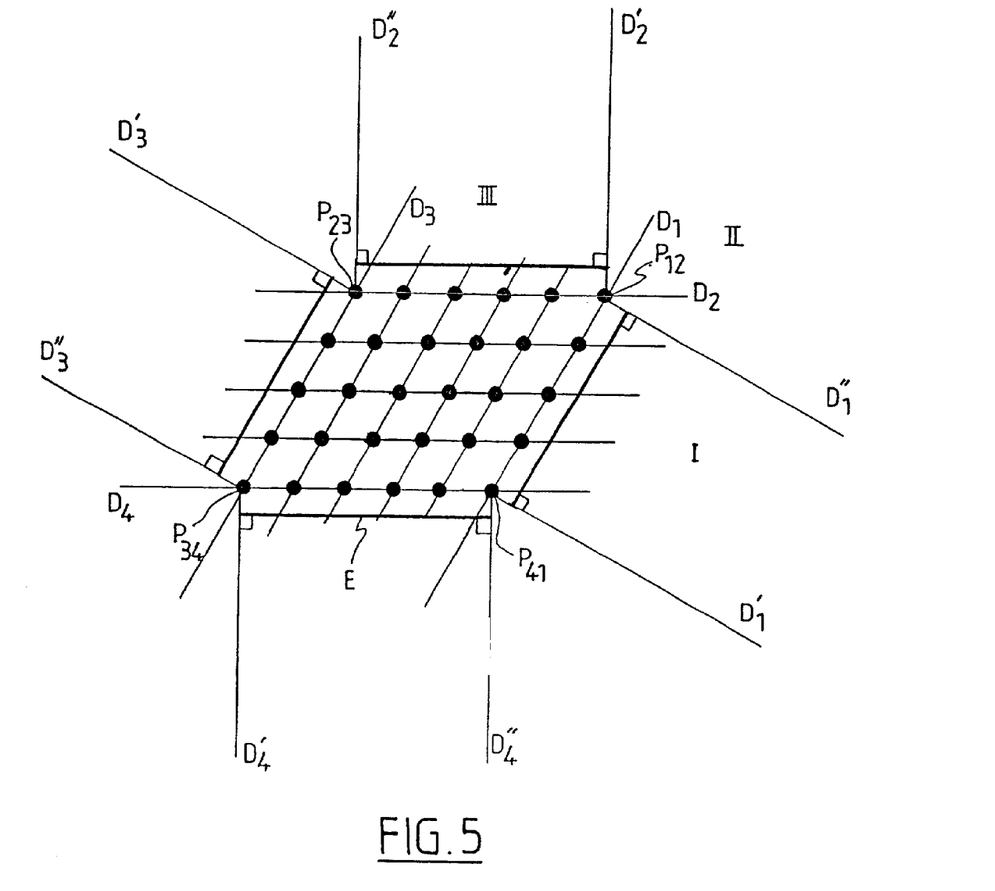
FIG. 5 illustrates an optimum choice of projection onto the constellation.

As mentioned above, the choice of projection is sub-optimal. The optimal choice would in fact correspond to that illustrated in FIG. 5. The areas of choice are delimited by straight lines orthogonal to the straight lines delimiting the constellation. Thus the points in zone I delimited by the straight lines $D'_1$ and $D''_1$ are projected onto the straight line $D_1$, the points in the sector II delimited by the straight lines $D''_1$ and $D'_2$ are "projected" onto the point $P_{12}$, the points in zone III delimited by the straight lines $D'_2$ and $D''_2$ are projected onto the straight line $D_2$, etc. FIG. 5 also shows an envelope E of the constellation which would correspond to this criterion. Naturally, the latter can be extended to a lattice of any dimension. Thus, for a parallelepipedal constellation of a lattice of dimension 3, the optimal choice would correspond to an orthogonal projection onto a polyhedral envelope, the polyhedron in fact being a parallelepiped with faces parallel to those of the constellation and on which all the angles are bisected.

According to a second embodiment of the invention, the orthogonal projection of the received point is effected directly onto an affine subspace delimiting the constellation (for example onto one of the straight lines $D_1, D_2, D_3, D_4$ or one of the points $P_{12}, P_{23}, P_{34}, P_{41}$ in the case of FIG. 4) and then a detection by spheres within this affine subspace is carried out, the advantage being of working in a space of dimension N which is smaller than the dimension κ of the lattice. In order to effect decoding in the lattice containing the affine subspace, it is necessary to project the received point directly onto the affine subspace. It can nevertheless be decided to effect the projection only if the received point is sufficiently far from the constellation. The conditions of choice of projection are therefore the same as before.

It will be shown first of all that the points of the lattice Ë of $R^K$ contained in the affine projection subspace can be modelled by points in a lattice Ë' of $R^N$. Such a modelling makes it possible to effect the decoding by spheres in a space of dimension $N \leq \kappa$ and to accelerate the detection.

If there are L dimensions such that $\rho_l \leq \beta_l^-$ or $\rho_l \geq \beta_l^+$, these values of $\rho_l$ are fixed at $M_l^-$ or $M_l^+$ according to circumstances and the received point is projected onto the corresponding affine subspace of dimension $N = \kappa - L$. With-out loss of generality, it can be assumed that these L fixed coordinates are the first L and are all fixed at the maximum value $M_l^+$. This therefore gives $\rho_l \geq \beta_l^+$ for $l = 1, \ldots, L$.

Let $z^P = \rho^P G$ be the projection onto the affine subspace of dimension N of the received vector z. According to the projection criterion $\rho^P$ is such that $\rho_l^P = M_l^+$ for $l = 1, \ldots, L$. It is therefore possible to write:

$$z^P = bG + n = b^0 B^0 + b^P B + n \quad (38)$$

where $b^0 = (M_1^+, \ldots, M_L^+) \in Z^L$, $b^P = (b_{L+1}, \ldots, b_\kappa) \in Z^N$, $B^0$ is a matrix of size (L×κ) and B a matrix of size (N×κ) defined as before and n is a noise vector.

The simplification of the detection presented in this section assumes that the point finally detected belongs to an affine subspace onto which the received point z has been projected. The first L components of the detected vector will therefore be equal to those of the vector $b^0$. The concern is therefore now solely with the detection of the row vector $\tilde{z}^P$ belonging to the vectorial subspace T and obtained by subtraction of the constant vector $z^0 = b^0 B$:

$$\tilde{z}^P = z^P - z^0 = b^P B + n \quad (39)$$

The matrix B contains N base vectors of size κ. $\tilde{z}^P$ is therefore a noisy point in a lattice Ë' of dimension N of $R^K$. So that the detection method by spheres can be directly applicable, it is necessary for the observed vector to be a noisy point in a lattice of dimension N in the space $R^N$. It is therefore necessary to find a matrix $B^{P'}$ containing N base vectors of size N and generating a lattice equivalent to that generated by B in $R^K$. Let $B^{P'}$ be the matrix of size (N×N) obtained by Cholesky decomposition of the Gram matrix $BB^T$. This decomposition guarantees that:

$$BB^T = B^{P'} B^{P'T} \quad (40)$$

The two matrices $B^{P'}$ and B have the same Gram matrix and therefore the norm defined by equation (22) is the same in both cases. In addition, the matrix $B^{P'}$ is inferior and triangular. This particularity makes it possible to save on the Cholesky decomposition normally carried out at the start of the detection by spheres.

Let U be the passage matrix of size (κ×N) such as $B^{P'} = BU$.

Let it be shown that $U = B^T(B^{P'-1})^T$. In fact, there is obtained according to (40):

$$BU = BB^T(B^{P'-1})^T = B^{P'} B^{P'T}(B^{P'-1})^T = B^{P'} \quad (41)$$

If the row vector of size κ representing a point on the lattice Ë' in $R^K$ is denoted $x^P = b^P B$ then $\tilde{x}^P$, the row vector of size N representing a point in the lattice in $R^N$, is obtained by:

$$\tilde{x}^P = x^P U = b^P B U = b^P B^{P'} \quad (42)$$

It is therefore necessary to make $\tilde{z}^P$ undergo the same transformation before detection, namely:

$$\tilde{z}^P U = (b^P B + n) U = b^P B^{P'} + n' \quad (43)$$

The covariance matrix of the noise vector n' is as follows:

$$E[n'^T n'] = U^T E[n^T n] U = N_0 U^T U \quad (44)$$

or, by virtue of the expression of U:

$$E[n'^T n'] = N_0 B^{P'-1} BB^T (B^{P'-1})^T = N_0 B^{P'-1} B^{P'} B^{P'T} (B^{P'-1})^T = N_0 I_N \quad (45)$$

No additional whitening of the noise is therefore necessary after projection.

The non-fixed integer coordinates (the fixed coordinates are given by $b^0$) are grouped together in $b^P$ and obtained by a detection by spheres of the vector $\tilde{z}^P U$.

Although the invention has been disclosed in the context of a DS-CDMA mobile telecommunication system, it also applies to an MC-CDMA (Multi-Carrier Code Division Multiple Access) mobile telecommunication system.

It should be stated that the MC-CDMA technique combines OFDM (Orthogonal Frequency Division Multiplex) modulation and the CDMA multiple access technique. Unlike the DS-CDMA method, in which the signal of each user is multiplied in the time domain in order to spread its frequency spectrum, the signature here multiplies the signal in the frequency domain, each element of the signature multiplying the signal of a different sub-carrier.

On reception, the samples of the received signal are subjected to an FFT and the signals relating to the different sub-carriers are then filtered by a filtering adapted to the signature of the user and the transmission channel.

It was shown in the French application No 0016351 filed on 13 Dec. 2000 by the applicant and incorporated here by reference that, if the vector of the signals received on the L different sub-carriers is denoted $r(i)=(r_1(i), \ldots, r_L(i))$ and the vector of the K symbols sent by or for the κ different users at instant i is denoted $d(i)=(d_1(i), \ldots, d_K(i))$, it will be possible to write, in the case where the users are received synchronously:

$$r(i)=d(i)AC(i)+\eta(i) \quad (46)$$

where $C(i)$ is a matrix translating the spreading by the signatures of the different users and the effect of the different transmission channels, $\eta(i)=(\eta_1(i), \ldots, \eta_L(i))$ is a white additive Gaussian noise vector and A is a diagonal matrix $\text{Diag}(a_1, \ldots, a_K)$ formed by the amplitudes of the signals of or for the different users.

As indicated in the abovementioned application, it can be shown that the knowledge of the observation vector $y(i)=(y_1(i), \ldots, y_K(i))$ where:

$$y(i)=r(i)C^H(i) \quad (47)$$

is sufficient to allow the detection in the sense of the maximum likelihood of the transmitted vector $d(i)$.

It is deduced therefrom that the observation vector can be expressed in the form:

$$y(i)=d(i)AC(i)C^H(i)+n(i)=d(i)M(i)+n(i) \quad (48)$$

where $n(i)$ is a coloured noise vector and $M(i)=C(i)C^H(i)$.

The vectors $y(i)$, $d(i)$, $n(i)$ and the matrix $M(i)$ appearing in equation (48) are of the complex component type. Equation (48) can also be written in the equivalent real form:

$$y_2(i)=d_2(i)M_2(i)+n_2(i) \quad (49)$$

with:

$y_2(i)=(y_1^R(i), y_1^I(i), \ldots, y_K^R(i), y_K^I(i))$ where $y_k^R(i)$, $y_k^I(i)$ are respectively the real part and the imaginary part of the symbol $y_k(i)$;

$d_2(i)=(d_1^R(i), d_1^I(i), \ldots, d_K^R(i), d_K^I(i))$ where $d_k^R(i)$, $d_k^I(i)$ are respectively the real part and the imaginary part of the symbol $d_k(i)$;

$n_2(i)=(n_1^R(i), n_1^I(i), \ldots, n_K^R(i), n_K^I(i))$ where $n_k^R(i)$, $n_k^I(i)$ are respectively the real part and the imaginary part of the symbol $n_k(i)$;

and where $M_2$ is the matrix $2K \times 2K$ defined by:

$$M_2 = \begin{bmatrix} M_{11}^R & M_{11}^I & \cdots & M_{1K}^R & M_{1K}^I \\ -M_{11}^I & M_{11}^R & \cdots & -M_{1K}^I & M_{1K}^R \\ \vdots & \vdots & & \vdots & \vdots \\ M_{K1}^R & M_{K1}^I & \cdots & M_{KK}^R & M_{KK}^I \\ -M_{K1}^I & M_{K1}^R & \cdots & -M_{KK}^I & M_{KK}^R \end{bmatrix} \quad (50)$$

with $M_{lk}=M_{lk}^R+j.M_{lk}^I$ where the index i has been omitted in order to simplify the notations.

Equation (49) has an identical form to that of equation (6) and consequently an algorithm for detection by spheres can be applied to the observation vector, including the simplification proposed by the invention when the received point is situated outside the constellation.

The invention claimed is:

1. A method of detecting, from a received signal, a plurality of symbols transmitted by or to a plurality of users, each symbol of a user belonging to a modulation constellation, the detection method using a lattice of points generated by a constellation including the modulation constellations, the plurality of symbols of the users being represented by a point among a subset of points in the lattice, the constellation and the received signal being represented by a point characteristic of the signal, referred to as the received point, translated from a point in the constellation by a noise vector, the method comprising:

orthogonally projecting the received point onto a first affine subspace, that is parallel to or merged with a second affine subspace delimiting the constellation; and determining a closest neighbor to the projected point among the points in the constellation.

2. The method according to claim 1, wherein the second affine subspace delimiting the constellation is determined according to the position of the received point with respect to the constellation.

3. The method according to claim 2, wherein the search for the closest neighbor is limited to points in the constellation belonging to a sphere centered on the projected point.

4. The method according to claim 1, wherein the first affine projection subspace is merged with the second affine subspace delimiting the constellation, the search for the closest neighbor is effected among points in the constellation belonging to the second affine subspace delimiting the constellation.

5. The method according to claim 4, wherein the search for the closest neighbor is limited to the points in the second affine subspace belonging to a sphere of the subspace centered on the projected point.

6. The method according to claim 1, wherein the projection step is performed only if the received point is remote from the constellation by more than a predetermined distance.

7. The method according to claim 1, wherein the symbols of each user are multiplied by a signature of the user before being transmitted over a transmission channel, coordinates of the received point are obtained by a step of adapted filtering of the received signal, the filtering being adapted to the transmission channels and to the signatures of the users.

8. A reception device for a DS-CDMA telecommunication system, comprising a detection device configured to detect, from a received signal, a plurality of symbols transmitted by or to a plurality of users, each symbol of a user belonging to a modulation constellation, the detection method using a lattice of points generated by a constellation including the modulation constellations, the plurality of symbols of the users being represented by a point among a subset of points in the lattice, the constellation and the received signal being represented by a point characteristic of the signal, referred to as the received point, translated from a point in the constellation by a noise vector, the device comprising:

means for orthogonally projecting the received point onto a first affine subspace that is parallel to or merged with a second affine subspace delimiting the constellation; and     means for determining a closest neighbor to the projected point among the points in the constellation.

9. A reception device for an MC-CDMA telecommunication system, comprising a detection device configured to detect, from a received signal, a plurality of symbols transmitted by or to a plurality of users, each symbol of a user belonging to a modulation constellation, the detection method using a lattice of points generated by a constellation including the modulation constellations, the plurality of symbols of the users being represented by a point among a subset of points in the lattice, the constellation and the received signal being represented by a point characteristic of the signal, referred to as the received point, translated from a point in the constellation by a noise vector, the detection device comprising:

means for orthogonally projecting the received point onto a first affine projection subspace that is parallel to or merged with a second affine subspace delimiting the constellation; and     means for determining a closest neighbor to the projected point among the points in the constellation.

* * * * *